(12) United States Patent
Schlatter et al.

(10) Patent No.: US 6,292,994 B1
(45) Date of Patent: *Sep. 25, 2001

(54) METHOD AND DEVICE FOR THE DISASSEMBLY OF CASSETTES

(75) Inventors: Manfred Schlatter, Freiburg; Norbert Müller, Friedelsheim; Gerhard Hoefer, Coburg, all of (DE)

(73) Assignee: EMTEC Magnetics GmbH, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,308
(22) PCT Filed: Nov. 11, 1996
(86) PCT No.: PCT/EP96/04916
 § 371 Date: May 7, 1998
 § 102(e) Date: May 7, 1998
(87) PCT Pub. No.: WO97/18072
 PCT Pub. Date: May 22, 1997

(30) Foreign Application Priority Data

Nov. 11, 1995 (DE) .............................. 195 42 078

(51) Int. Cl.⁷ .................................................. B23P 19/02
(52) U.S. Cl. ...................... 29/426.4; 29/426.1; 29/426.3; 29/806; 29/403.1
(58) Field of Search ................................ 29/426.1, 426.3, 29/426.4, 806, 403.1, 403.2, 403.3

(56) References Cited

U.S. PATENT DOCUMENTS

| | | | |
|---|---|---|---|
| 2,209,209 | * | 7/1940 | Ruby . |
| 3,411,682 | * | 11/1968 | Leader et al. . |
| 3,548,478 | * | 12/1970 | Blackman . |
| 3,579,801 | * | 5/1971 | Ishihara . |
| 3,768,133 | * | 10/1973 | Scappator et al. . |
| 3,829,947 | * | 8/1974 | Nakamura et al. . |
| 3,857,153 | * | 12/1974 | Takiguchi et al. . |
| 4,208,116 | * | 6/1980 | Morse . |
| 4,247,977 | * | 2/1981 | Nakamura . |
| 4,418,460 | * | 12/1983 | Ruth . |
| 4,443,925 | * | 4/1984 | Fish . |
| 4,464,830 | * | 8/1984 | Carlsson . |
| 4,765,050 | * | 8/1988 | Espin . |
| 4,842,217 | * | 6/1989 | Vinson ................................ 242/199 |
| 5,217,172 | * | 6/1993 | Phillips et al. . |
| 5,299,348 | * | 4/1994 | Slack et al. . |
| 5,806,784 | * | 9/1998 | Perego . |

FOREIGN PATENT DOCUMENTS

| | | | |
|---|---|---|---|
| 42 32 340 | | 1/1994 | (DE) . |
| 577008 | * | 1/1994 | (EP) . |
| 596509-A1 | * | 5/1994 | (EP) ................................ 29/426.3 |
| 598393 | * | 5/1994 | (EP) . |
| 599230 | * | 6/1994 | (EP) ................................ 29/426.1 |
| 639 406 | | 2/1995 | (EP) . |
| 8306157 | * | 1/1994 | (JP) . |
| 1542-769-A | * | 2/1990 | (SU) ................................ 29/426.1 |

OTHER PUBLICATIONS

Derwent JP 83/06157.

* cited by examiner

Primary Examiner—S. Thomas Hughes
Assistant Examiner—John C. Hong
(74) Attorney, Agent, or Firm—Keil & Weinkauf

(57) ABSTRACT

Processes and apparatuses for partly disassembling tape cassettes having at least one closure flap comprise separating the closure flap from the cassette or from the cassette housing at an early time, before, during or shortly after the opening of the cassette. Several process methods and examples of apparatus are specified. The separating methods and apparatuses can be expediently used for all tape cassettes with one or more closure flaps, it being possible for these to be any type of audio, video and data cassettes.

10 Claims, 4 Drawing Sheets

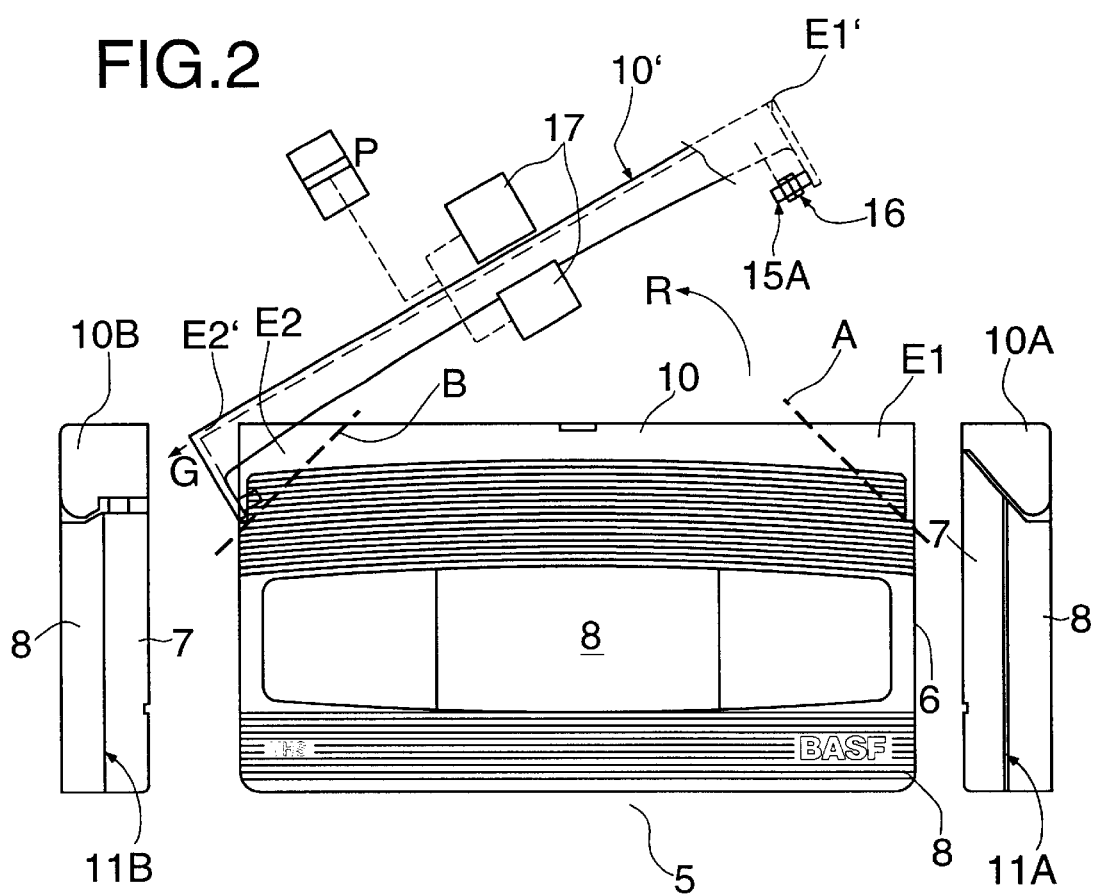
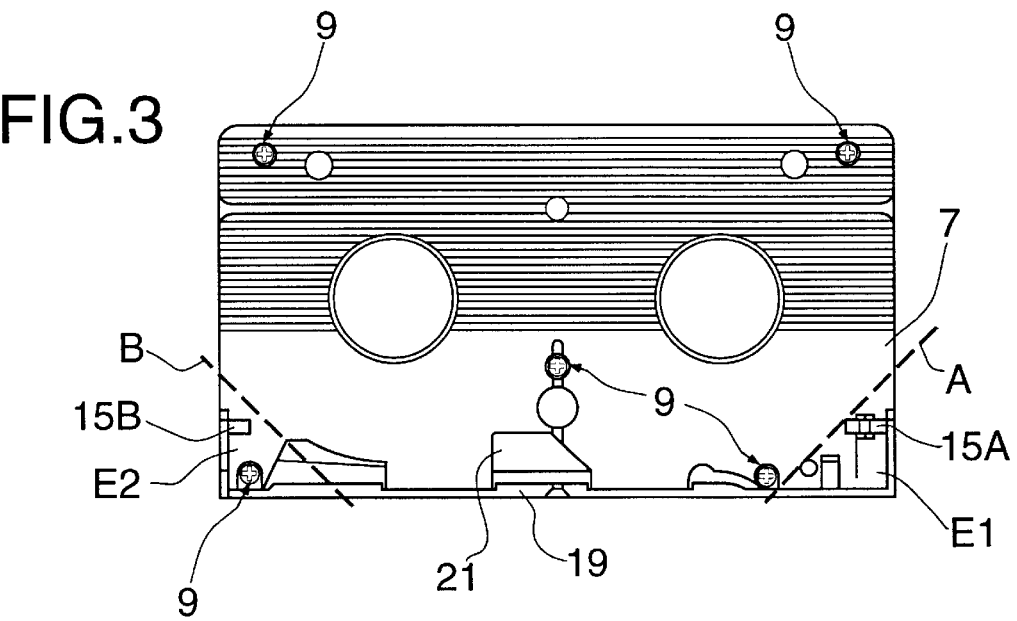

METHOD AND DEVICE FOR THE DISASSEMBLY OF CASSETTES

FIELD OF THE INVENTION

The invention relates to processes and apparatuses for disassembling tape cassettes having a housing and at least one closure flap connected thereto and at least one tape reel located in the housing, the tape cassette being transported past disassembly stations.

DESCRIPTION OF THE RELATED ART

DE-A 42 21 340 discloses an apparatus for the automatic dismantling of cassettes. In this case, the cassette housing is dismantled by elements which are arranged on rollers or belts, can be moved in opposite directions and penetrate partially into the cassette. The internal parts still attached to some extent are subsequently separated from the housing by means of separating devices.

EP-A 0 577 008 describes a cassette which was designed for particularly simple recycling, since all the component parts of the cassette with the exception of the magnetic tape and the front flap spring are produced from the same plastic material. For the disassembly of internal parts, the cassette has a plurality of openings. It is thus possible, for example, to remove the tape retaining clips from outside and consequently to remove the magnetic tape without dismantling the housing. Another opening makes it possible for the front flap spring, which is freed after removal of the front flap, to fall out of the cassette housing.

The applicant's EP-A 0 639 406 discloses a process and apparatuses for recycling magnetic tape cassettes, in particular video cassettes. Material identification devices control the recycling process according to the particular material. In the case of this process, however, the video cassettes are conveyed over relatively long distances to disassembly stations before the cassettes are dismantled into their individual parts. Since, in this case, the closure flap remains connected to the cassette housing, difficulties may occur on the transporting route and during further disassembly.

SUMMARY OF THE INVENTION

It is an object of the present invention to avoid such difficulties.

We have found that this object is achieved by a process for disassembling tape cassettes having a housing and at least one closure flap connected thereto and at least one tape reel located in the housing, the tape cassette being transported past disassembly stations, if before or during or shortly after the opening of the housing a separation of the closure flap(s) from the housing takes place at the corresponding disassembly station.

In this case, the closure flap may be removed in a suitable way, still to be described, before the opening of the housing, in other words while the housing is still closed, during the opening of the housing, in other words at substantially the same time as the removal of the connecting elements while the housing is still closed, or at substantially the same time as the separation of the housing, for example into the bottom and top parts, or shortly after the opening of the housing, in other words when the housing parts, that is for example the bottom and top parts, have already been separated.

It is thereby ensured that 1. the closure flap cannot unintentionally become detached on the further transporting route of the cassette to be disassembled and, as a result, hinder or block automated disassembly operations, and
2. the closure flap is removed from the longitudinal side of the housing, where, as long as it is present, it blocks the entry of, for example, gripping elements of the disassembly stations,
3. if the closure flap consists of a different plastic than the housing, an early material separation can take place.

BRIEF DESCRIPTION OF THE DRAWINGS

FIG. 2 shows a plan view from above of the top part of the housing of the cassette according to FIG. 1

FIGS. 2A,2B show an elevation of the transverse sides of the housing

FIG. 3 shows a plan view of the bottom part of the housing from below

DESCRIPTION OF THE PREFERRED EMBODIMENTS

Figure 1:
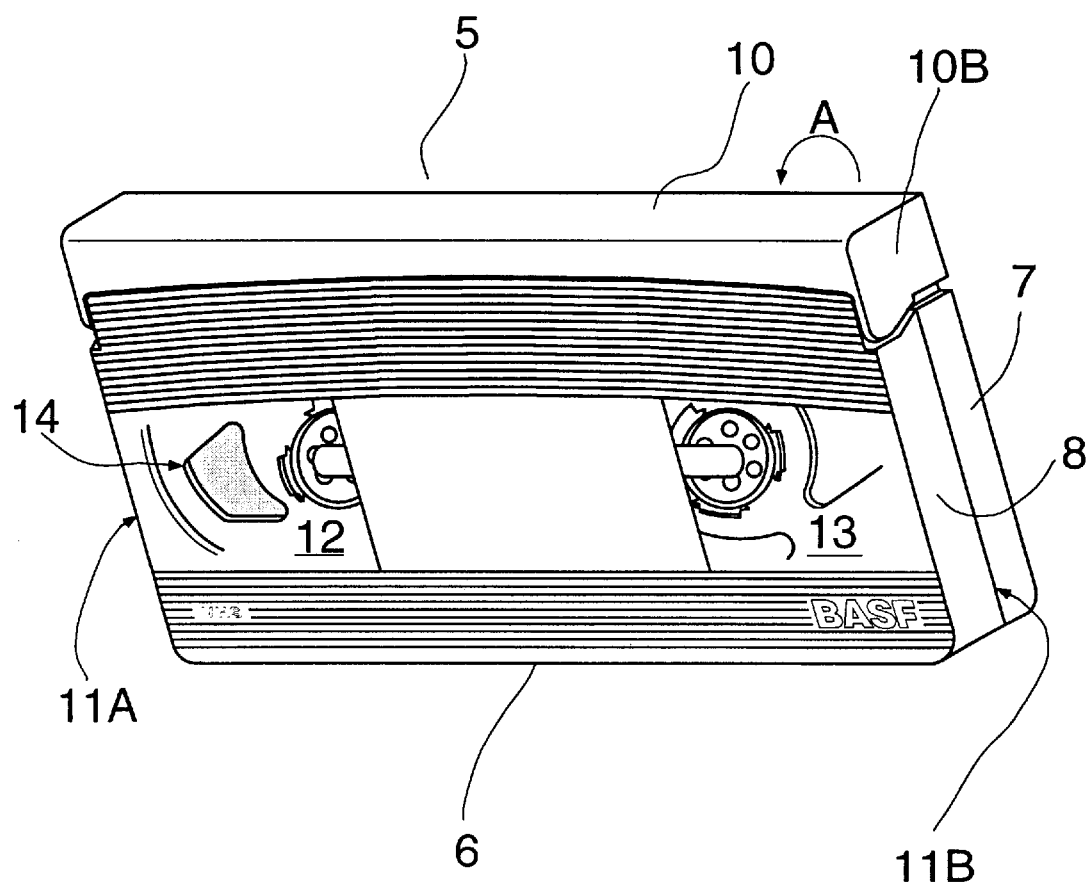
FIG. 1 perspectively shows a commercially available VHS video cassette

In a practical embodiment of the process, a separation of the closure flap(s) may be performed by knocking off or cutting off at least one corner of the housing at which one end of the closure flap is arranged, with the result of producing a free end of the closure flap.

As a further step in the separating operation, the free end of the closure flap may be pivoted in one direction, with the result that the other end of the closure flap is separated from the housing.

For tape cassettes with at least one closure flap which is arranged on a longitudinal side of the tape cassette and reaches around the transverse sides of the cassette by means of side parts with fastening lugs on them, the separation of the closure flap(s) may take place by reaching between a side part of the closure flap and the adjoining transverse side of the housing and by bending out from the housing the fastening lug on the side part, thereby producing a free end of the closure flap.

In this way, the flexibility of the side parts is advantageously used for separation. A variant of this is to reach between each of the two side parts of the closure flap and each of the adjoining transverse sides of the housing and destroy the fastening lugs.

In a further embodiment of the process, the tape cassette having a housing comprising a bottom part and a top part and having openings adjoining the closure flap in at least one of the bottom and top parts, the separation of the closure flap(s) may take place by means of pressure on the closure flap through at least one of the openings.

It is also advantageous if the free end of the closure flap(s) is swiveled substantially in the plane of the housing. The pivoting angle may in this case be up to about 60°. As a result, a fastening lug of the closure flap can be turned out of its housing wall opening for the separation of the closure flap.

An advantageous apparatus for disassembling tape cassettes having a housing and at least one closure flap connected thereto and at least one tape reel located in the housing, the tape cassette being moved past disassembly stations by means of a transporting device, is created according to the invention if there is provided an opening device for the housing and at least one device for separating the closure flap from the closed or open housing, arranged in front of or parallel to or directly behind said opening device, seen in the transporting direction. As a result, the advantages described according to the invention are obtained.

A further expedient embodiment of the apparatus for a tape cassette in which the closure flap is connected to the housing by means of fastening lugs at each end is provided by the separating device comprising a cutting device and a swiveling mechanism, of which the cutting device separates one of the fastening lugs from the housing or destroys it, with the result of producing a free end of the closure flap, and the swiveling mechanism pivots the free end of the closure flap in one direction, with the result that the other fastening lug is separated from the housing or destroyed.

Alternatively, the separating device may also comprise a pressure-exerting device, whereby the closure flap is removed from the housing.

Exemplary embodiments now are represented and explained by means of apparatuses as shown in the drawings.

The video cassette 5 comprises a housing 6 which is made up of the bottom part 7 and the top part 8 connected, for example, by screw connections 9 (see FIG. 3), and a closure flap 10, which is mounted such that it can swivel in the direction of the arrow A on the housing 6, in particular on the transverse sides 11A and 11B. The tape reels 12 and 13 can be seen through the windows in the top part 8 (FIG. 1), the one tape reel 12 being wound with tape 14 and the other tape reel 13 being empty. The closure flap 10 is provided with side parts 10A and 11B.

Figure 4:
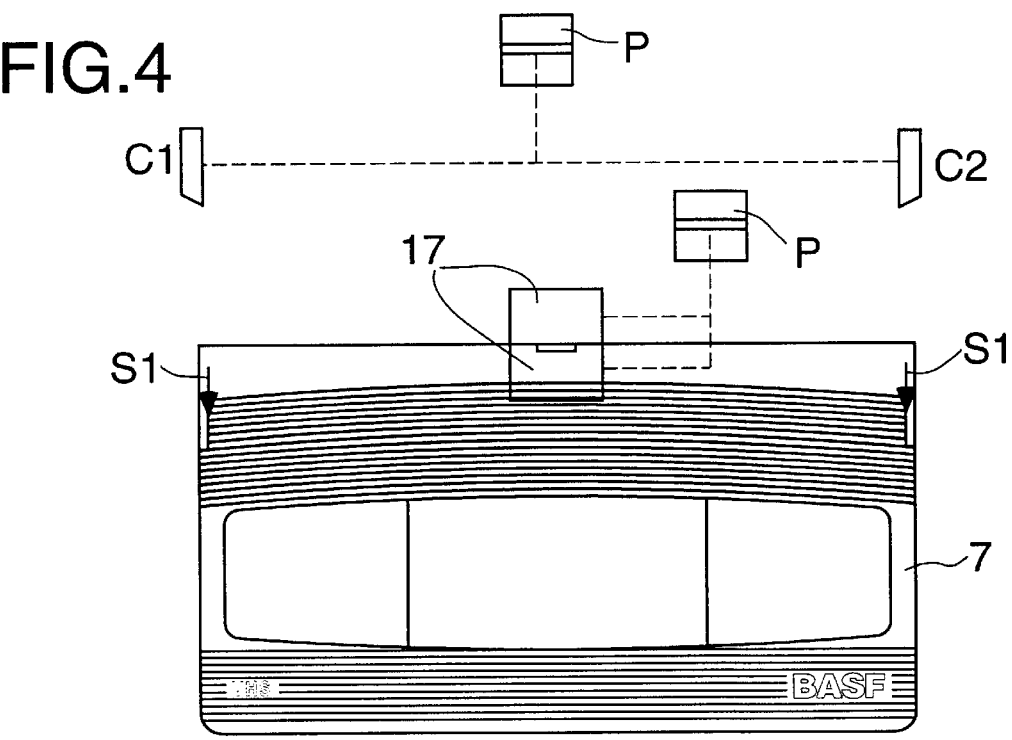
FIG. 4 shows a plan view according to FIG. 2 with separating devices
Figure 5:
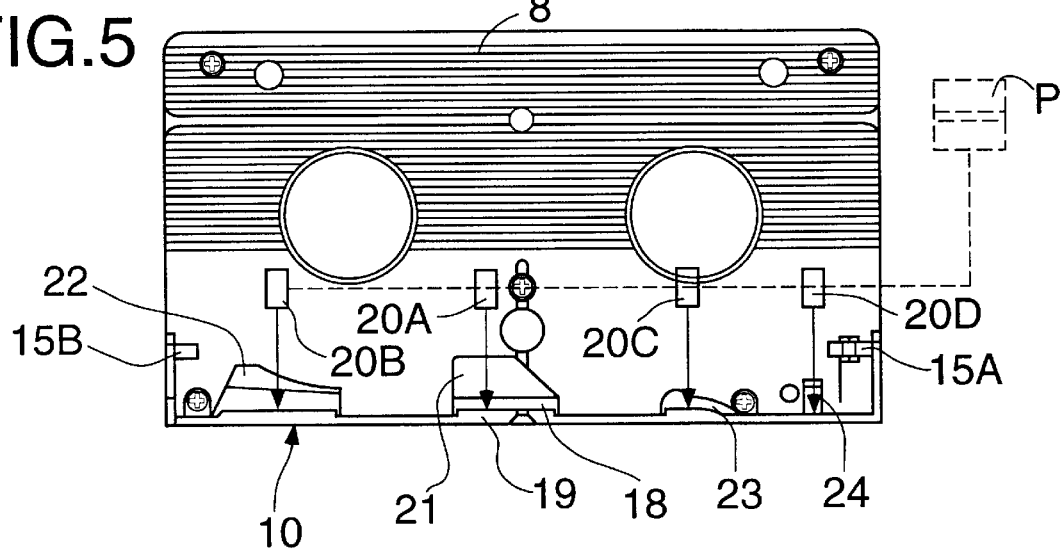
FIG. 5 shows a plan view of the bottom part according to FIG. 3 with arrows to represent the separating operations

FIGS. 2 and 4 show the upper side of the video cassette 5 and FIGS. 3 and 5 show its underside, in each case diagrammatically without visible reels and tape.

In the elevation drawings 2A, 2B of the transverse sides 11B and 11A, respectively, the side parts 10B and 10A of the closure flap 10 can be seen in plan view.

If in FIG. 2 or 3, the cut A, for example, is made by means of a suitable hitting or cutting device, for example a guillotine device, and the upper right-hand cassette corner E1 is detached, at the same time the connection of the closure flap 10 to the housing 6, here the transverse side 11B, is broken, since the fastening lug 15A—and also the closing spring 16—are detached, see the dashed-line part E1 of the already pivoted closure flap 10'.

The pivoting of the closure flap 10 in the position 101 takes place by means of a pivotably mounted, suitable gripping device 17, which, when suitably actuated, grips the front side 19 of the closure flap 10, for example in the cutout 18 of the bottom part 7, and pivots said front side in the direction of the arrow R. Either the fastening lug 15B on the other side part 10A of the closure flap 10' breaks off, or the fastening lug 15B disengages from the transverse side 11A of the housing 6 during the simultaneous displacement of the closure flap 10' in direction G. In both cases, the closure flap can be passed on for plastics recycling. The spring 16 can be removed, with the result that the corner part E1 can be transported to the plastics recycling. The described pivoting of the closure flap may also take place at the other corner and in the other pivoting direction with the same advantages.

As indicated by the second dashed line, it is also possible in FIG. 2 to make a second cut B and thus also detach the left-hand cassette corner E2.

In this case, the gripper 17 needs only to dispose of the central part of the closure flap 10 without corner parts E1 and E2. In the bottom corner part E1, which is produced when the corner cut is made, there may also be a locking spring (not shown), which can be removed together with the closing spring 16, for example by means of a grinding device for the bottom and flap corner parts E1, and can be separated from the plastic material by means of a magnetic device (not shown), with the result that the remaining parts can again be taken for plastics recycling.

Figure 4A:
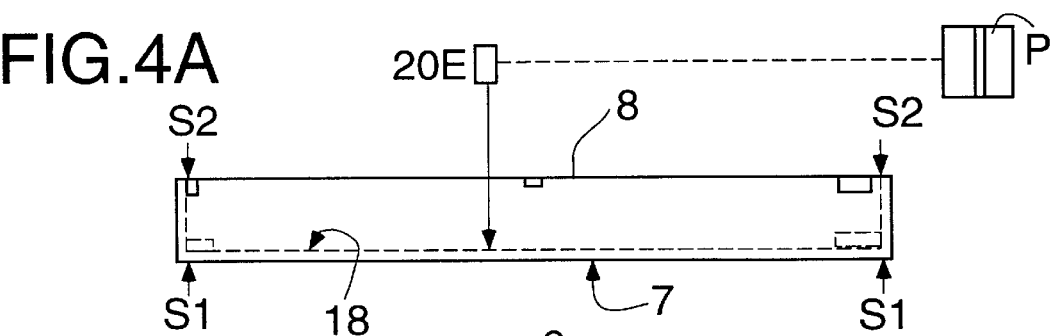
FIG. 4A shows an elevation of the front longitudinal side of the cassette lying on the top part

In FIGS. 4A and 4 it is diagrammatically represented, arrows S, that the side parts 10A, 10B of the closure flap 10 can be detached by cutting tools C1 and C2. In this case, the fastening lugs 15A and B indicated in FIG. 5 are destroyed in particular, and the closure flap 10 is pulled off by means of the gripping elements 17 or equivalent devices and sent to the plastics recycling.

This separating operation, which may take place at both locations, arrows S1 (top part 8) or arrows S2 (bottom part 7) at the same time or else one after the other, has the effect that the closing spring 16 with the lug 15A is separated from the closure flap 10. The locking spring, which may be provided in the bottom corner part E1, should then expediently be separated.

In FIG. 4A it is once again indicated at which locations S1 on the upper side (top part 8) and S2 on the underside (bottom part 7) the cutting tools C1 and C2 can reach between side parts 10A, 10B and the transverse side 11A or 11B, respectively.

Suitable as cutting tools C1, C2 are wedge blades and knife blades or sawing elements.

A further possibility for separating the closure flap 10 is represented in FIG. 5 and partially also in FIG. 4A. In this case, the closure flap 10 is to be pressed outwardly from inside by means of at least one pressure-exerting device and thereby separated from the housing 6.

Represented as pressure-exerting devices are pressure-exerting elements 20A to 20D, which in FIG. 5 enter obliquely from above into the cutouts 21–24 and keep pressing against the front wall 19 of the closure flap 10 until the fastening lugs 15A and 15B break or at least loosen. Less than 4 pressure-exerting devices 20A to 20D may also be used. The pressure applied should be about 40 N in the case of 4 pressure-exerting devices.

Represented in FIG. 4A is the case in which a pressure-exerting device 20E acts, for example through the cutout 21, substantially perpendicularly, on the front side 19 of the closure flap 10 and accomplishes a breaking out of said flap.

A number of the pressure-exerting devices 20A–20E may well be combined, with the result that a great disassembling effect can be achieved with little technical outlay. The disassembled complete or partial closure flaps are transported by means of grippers, as described above, or directly into suitable containers for plastics recycling.

Diagrammatically represented as force-generating devices for the gripping devices 17 and the pressure-exerting devices 20A–20E are cylinders P, which are connected by dashed lines of action to the operational units, 20A–20E. The cylinders P are intended to represent hydraulic, pneumatic or electromagnetic force generators.

Figure 6A:
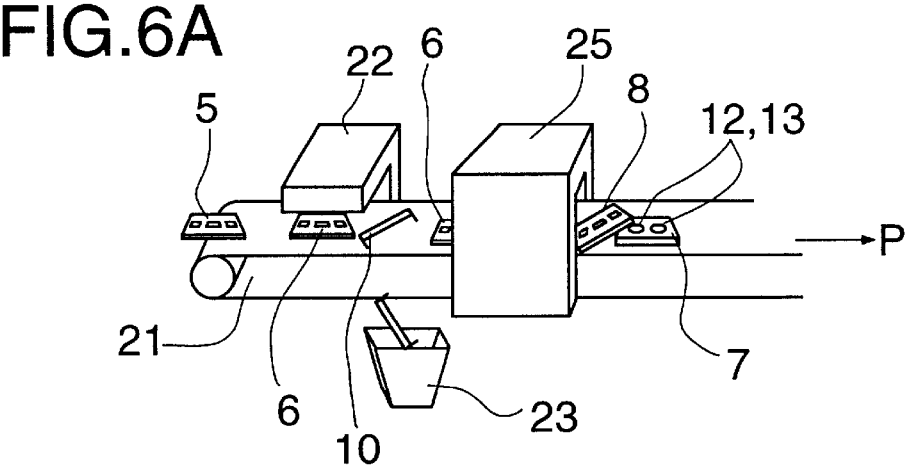
FIGS. 6A–6C show a conveying device with disassembly stations, the flap separating station being arranged before, inside or after the opening station.
Figure 6B:
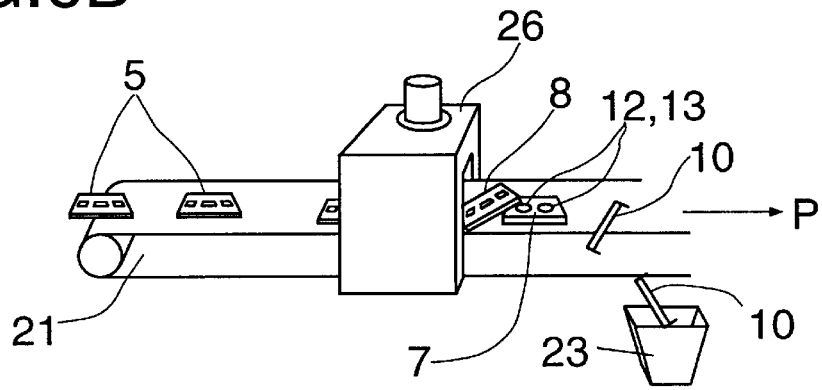
Figure 6C:
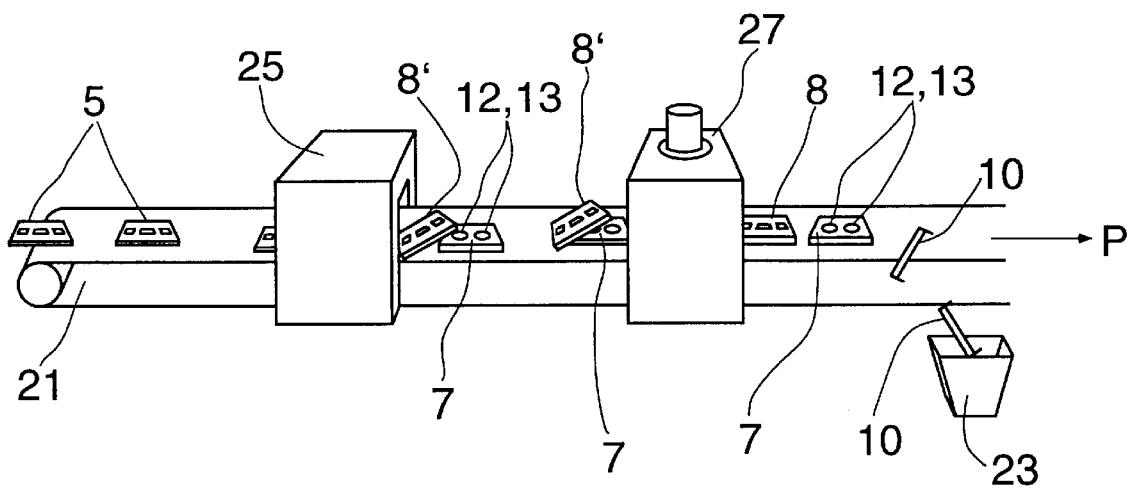

FIGS. 6A–6C each show a diagrammatic representation of the arrangement of the opening and separating station(s)

on a disassembly line for tape cassettes according to the present invention.

In FIGS. 6A–6C, the tape cassettes 5 are in each case placed onto the conveyor belt 30, which transports them further in direction Q. The stations are arranged differently in FIGS. 6A–6C.

In FIG. 6A, the cassette 5 which is conveyed to the flap-separating station 28, in which the closure flap 10 is separated from the housing 6 by one of the processes described above and by means of the devices described, is still closed. Before reaching the opening station 25, the flap 10 falls into a container 29—possibly by means of a separating device not shown—for plastic to be recycled. The opening station 25 opens the housing 6 and dismantles it into bottom and top parts 7 and 8 with the tape reel or reels 12 and 13, respectively.

In FIG. 6B, the closed cassettes 5 are sent directly to a station 26, in which there is both an opening device and a flap separating device. After the station 26, the bottom and top parts 7 and 8 and the closure flap 10 can be seen as individual parts on the belt 30 and, as in FIG. 6A, the flap 10 falls into the plastics recycling container 29. In this example, the flap 10 may thus be separated substantially during the opening of the cassette.

FIG. 6C finally shows the separation of the flap 10 in a flap separating station 27, in which the cassette already separated in the opening station 25 into the top part 8, which is still connected to the flap 10, and the bottom part 7 is opened.

FIG. 6C finally shows the opening station 25, in which the top part 8', which is still connected to the flap 10, and the bottom part 7 are separated from each other, in other words the cassette 5 is opened, and a flap separating station 27 arranged directly thereafter, in which the flap 10 is separated from the top part 8 and is then disposed of, as in FIG. 6B, into the recycling container 23.

The top parts and bottom parts 8 and 7 still on the conveyor belt 30 in each of the cases, FIGS. 6A–6C, are further conveyed in direction Q, where the remaining disassembly operations, which are no longer described or shown, take place without the closure flap being able to cause any disruptions or damage.

To be understood as the "closure flap" for the purposes of the invention are, for example, also sliding closures, such as are used for example on diskettes or DCC cassettes.

We claim:

1. A process for partially disassembling a tape cassette, which process avoids difficulties during partial disassembling, transporting, and further disassembling of internal parts of the tape cassette for recycling, the tape cassette including
a closure flap,
at least one closure flap spring, and
a housing having
at least one tape reel located therein,
a top part,
a bottom part, and
openings adjoining the closure flap in at least one of the top part and the bottom part,
wherein the process excludes any step of removing the closure flap spring or springs through an opening in any part of the housing,
the process comprising the steps of separating the closure flap from the housing by separating the top part of the housing from the bottom part of the housing wherein separating the closure flap is effected by removing a corner of the housing to produce a free end of the closure flap.

2. The process of claim 1, wherein separating a closure flap from the housing is effected prior to separating the top part of the housing from the bottom part of the housing.

3. The process of claim 1, wherein separating a closure flap from the housing is effected in the course of separating the top part of the housing from the bottom part of the housing.

4. The process of claim 1, wherein separating a closure flap from the housing is effected subsequent to separating the top part of the housing from the bottom part of the housing.

5. The process of claim 1, wherein the free end of the closure flap is moved at an angle about a pivot so the closure flap is separated from the housing.

6. The process of claim 5, wherein the free end of the closure flap is swivelled substantially in the plane of the housing.

7. The process of claim 6, wherein the angle of movement about the pivot is about 60°.

8. The process of claim 1, wherein none of the top part of the housing, the bottom part of the housing, or the closure flap has any openings for removal of the closure flap spring or springs.

9. The process of claim 1, wherein the closure flap is made from a different material than the housing.

10. The process of claim 1, wherein the process further comprises recycling the closure flap separately from the housing.

* * * * *